US009152572B2

(12) United States Patent
Ronen et al.

(10) Patent No.: US 9,152,572 B2
(45) Date of Patent: Oct. 6, 2015

(54) TRANSLATION LOOKASIDE BUFFER FOR MULTIPLE CONTEXT COMPUTE ENGINE

(75) Inventors: Ronny Ronen, Haifa (IL); Boris Ginzburg, Haifa (IL); Eliezer Weissmann, Haifa (IL); Karthikeyan Vaithianathan, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 182 days.

(21) Appl. No.: 13/993,800

(22) PCT Filed: Dec. 30, 2011

(86) PCT No.: PCT/US2011/068056
§ 371 (c)(1),
(2), (4) Date: Jun. 13, 2013

(87) PCT Pub. No.: WO2013/101168
PCT Pub. Date: Jul. 4, 2013

(65) Prior Publication Data
US 2013/0262816 A1    Oct. 3, 2013

(51) Int. Cl.
*G06F 12/00*    (2006.01)
*G06F 12/10*    (2006.01)
*G06F 12/08*    (2006.01)

(52) U.S. Cl.
CPC ........ *G06F 12/1027* (2013.01); *G06F 12/0806* (2013.01); *G06F 12/1009* (2013.01); *G06F 12/1036* (2013.01); *G06F 2212/65* (2013.01); *G06F 2212/68* (2013.01); *G06F 2212/684* (2013.01)

(58) Field of Classification Search
CPC ..... G06F 12/08; G06F 12/0806; G06F 12/10; G06F 12/1009; G06F 12/1027; G06F 12/1036; G06F 2212/65; G06F 2212/68; G06F 2212/684
See application file for complete search history.

(56) References Cited

U.S. PATENT DOCUMENTS

| 7,461,232 | B2 | 12/2008 | Nicolai | |
|---|---|---|---|---|
| 8,024,547 | B2 | 9/2011 | Lee et al. | |
| 2009/0228667 | A1* | 9/2009 | Koehler et al. | 711/160 |
| 2009/0327647 | A1* | 12/2009 | Ingle et al. | 711/207 |

OTHER PUBLICATIONS

PCT International Search Report for PCT Counterpart Application No. PCT/US2011/068056, 3 pgs., (Sep. 24, 2012).
(Continued)

*Primary Examiner* — Shawn X Gu
(74) *Attorney, Agent, or Firm* — Nicholson De Vos Webster & Elliott LLP

(57) ABSTRACT

Some implementations disclosed herein provide techniques and arrangements for an specialized logic engine that includes translation lookaside buffer to support multiple threads executing on multiple cores. The translation lookaside buffer enables the specialized logic engine to directly access a virtual address of a thread executing on one of the plurality of processing cores. For example, an acceleration compute engine may receive one or more instructions from a thread executed by a processing core. The acceleration compute engine may retrieve, based on an address space identifier associated with the one or more instructions, a physical address associated with the one or more instructions from the translation lookaside buffer to execute the one or more instructions using the physical address.

16 Claims, 8 Drawing Sheets

(56) References Cited

OTHER PUBLICATIONS

PCT Written Opinion of the International Searching Authority for PCT Counterpart Application No. PCT/US2011/068056, 4 pgs., (Sep. 24, 2012).

PCT Notification concerning Transmittal of International Preliminary Report on Patentability (Chapter I of the Patent Cooperation Treaty) for PCT Counterpart Application No. PCT/US2011/068056, 6 pgs., (Jul. 10, 2014).

* cited by examiner

TRANSLATION LOOKASIDE BUFFER FOR MULTIPLE CONTEXT COMPUTE ENGINE

CROSS-REFERENCE TO RELATED APPLICATIONS

This patent application is a U.S. National Phase Application under 35 U.S.C. §371 of International Application No. PCT/US2011/068056, filed Dec. 30, 2011, entitled TRANSLATION LOOKASIDE BUFFER FOR MULTIPLE CONTEXT COMPUTE ENGINE.

TECHNICAL FIELD

Some embodiments of the invention generally relate to the operation of processors. More particularly, some embodiments of the invention relate to a translation lookaside buffer for a multiple context compute engine.

BACKGROUND

A processor with multiple (e.g., two or more) cores may include resources that are shared by multiple threads executing on the multiple physical or logical cores. A single physical core may provide multiple logical cores using techniques such as simultaneous multi-threading (e.g., Hyper-threading). The multiple threads executing on the multiple cores may contend with each other to access the relatively few resources.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

DETAILED DESCRIPTION

Figure 1:
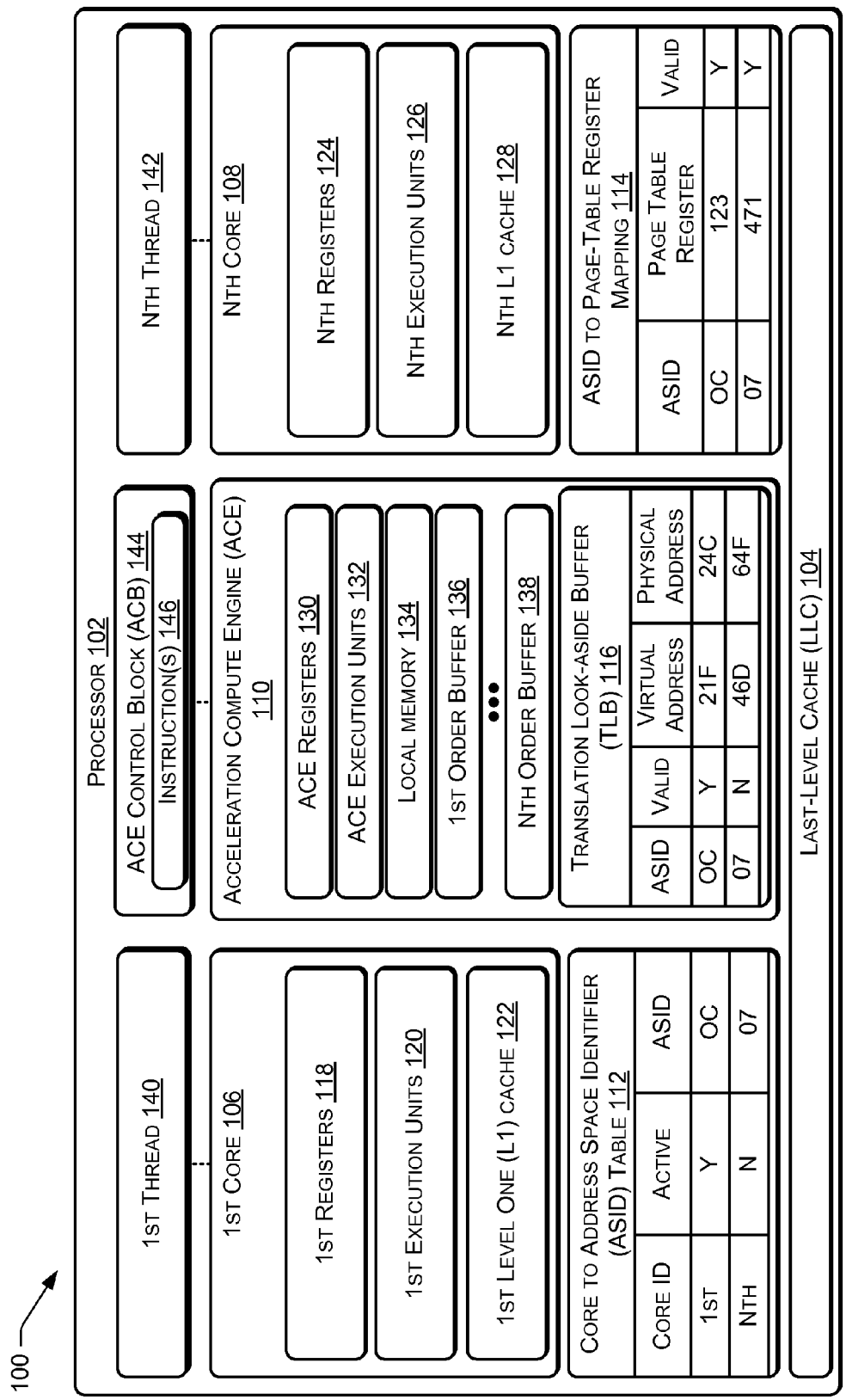
FIG. 1 illustrates an example framework including an acceleration compute engine according to some implementations.

Enabling Multiple Threads to Access a Resource in a Processor

The technologies described herein generally relate to enabling multiple threads executing on multiple logical (or physical) processing cores ("cores") to access a resource in a processor. While an accelerated compute engine (ACE) is used herein as an example of a resource, the technologies described herein may be used to enable access to other processor-related resources, such as resources internal to or external to the processor. In addition, while the examples described herein illustrate a single ACE that is shared by multiple cores, in some implementations, a processor may have more than one ACE. For example, a processor may include multiple ACE units, with each ACE being shared by a particular number of cores. To illustrate, if a single ACE is capable of supporting four cores, a processor with eight cores may have two ACE units, a processor with twelve cores may have three ACE units, and so on. Thus, in some cases, the number of ACE units may be proportional to the number of cores, based on how many cores a single ACE is capable of supporting.

As used herein, the term core may refer to a logical core or to a physical core (e.g., an execution unit and associated caches). To illustrate, a technique such as simultaneous multi-threading (e.g., hyper-threading) may be used to provide two (or more) logical cores from the resources of a single physical core. For example, a processor with two physical cores may provide a total of four logical cores that are capable of simultaneously executing four threads.

An ACE may provide specialized functionality to one or more cores (e.g., general purpose cores) in a processor. For example, the ACE may provide the cores in the processor with fine-grained control over specialized functions, such as graphics functions or arithmetic functions. To illustrate, a conventional graphics processing unit (GPU), when called upon by a core, may execute on the order of millions of instructions. In contrast, the ACE may execute on the order of hundreds of instructions or thousands of instructions. By incorporating specialized resources, such as the ACE, a processor may achieve a significant increase in performance and/or a significant decrease in power consumption as compared to processors that do not include such specialized resources.

As another example of the fine-grained control, applications (e.g., threads) executing on the multiple cores may directly access the ACE. Direct access means that the applications may access the ACE without using an intermediary, such as a device driver, operating system, and the like. Applications may directly access the ACE while the applications are executing in user-mode (e.g., rather than in kernel-mode). In some implementations, an operating system may be aware of the ACE while in other implementations the operating system may be unaware of the ACE. Applications may be allowed direct access to the ACE regardless of whether or not the operating system is aware of the ACE.

To allow high performance of an ACE supporting fine-grained access, virtual addresses associated with the threads may be shared between the multiple cores and the ACE to enable the ACE to directly access the address spaces associated with the threads by providing the ACE with a translation lookaside buffer (TLB). In an implementation that includes multiple ACE units, each ACE unit may include a corresponding TLB. In addition, the ACE may perform a page walk when a TLB miss occurs.

In some implementations, an asynchronous interface may be provided to access the ACE, such that an application may send instructions to the ACE and the application may continue executing on a particular core in parallel with the instructions executing on the ACE. In other implementations, a synchronous interface may be provided to enable applications to access the ACE. For example, a synchronous interface may transparently handle events, such as page faults and the like, that applications are incapable of handling. In still other implementations, both a synchronous interface and an asynchronous interface may be provided.

The multiple threads may interact with the ACE using an ACE control block (ACB). For example, the ACB may include (1) a header block that includes a status (e.g., new, inside execution pipe, done, page fault, invalid, and the like) associated with execution of instructions in the ACB, (2) an input parameter identifier that identifies input parameters, (3) an output data identifier that identifies where to output the results of processing the input parameters, and (4) an output error identifier that identifies output error-related data, such as error messages and data dumps (e.g., contents of registers, caches, pipelines, and the like). Of course, the ACB may include other content in addition to or instead of the previously described content. The content of the ACB may vary depending on the particular function of the ACE that is being called. The ACB may be received as parameter to a transaction. For example, a transaction may provide a location of an ACB.

The multiple threads executing on the multiple cores of the processor may contend with each other to access a resource, such as the ACE, because the number of resources may be significantly less than the number of threads that are executing. To enable a single ACE to support requests from multiple threads and their associated contexts, a translation lookaside buffer (TLB) of the ACE may support multiple contexts associated with multiple threads executing on multiple cores in the processor. In general, a context associated with a thread may include a set of data used by the thread that may be saved to enable the execution of thread to be interrupted at a particular point in time and resumed at a later point in time. In particular, the context may include an address space identifier that enables access to a virtual memory space that is associated with the thread. Among the multiple threads, some threads may operate in different virtual address spaces while other threads may operate in the same virtual address space.

A translation lookaside buffer (TLB) may be used to improve the speed of translating a virtual address to a physical address. In some cases, the TLB may be implemented using content-addressable memory (CAM). The TLB may use a particular virtual address (also referred to as a tag) as a key to search the TLB for a physical address that corresponds to the particular virtual address. If the TLB includes the physical address, the search yields a match and the physical address may be retrieved from the TLB and used to access physical memory. This is referred to as a TLB hit. If the TLB does not map the physical address, a TLB-miss occurs. The TLB-miss may be handled by identifying the physical address that corresponds to the particular virtual address. For example, a page walk may be performed, in which a page table and/or page directories are accessed, to determine the physical address. After the physical address is determined by the page walk, the TLB may be modified to include an entry that maps the particular virtual address to the physical address. By modifying the TLB to include an entry that maps the particular virtual address to the physical address, the physical address may be retrieved from the TLB in response to a subsequent search of the TLB for the particular virtual address. For example, a particular register (e.g., register CR3 in some Intel® processors) of the processor may enable translation of a virtual address to a physical address by identifying a location of the page directory and page tables for a current thread. The TLB may use the particular register when performing the page walk to identify the physical address that corresponds to the particular virtual address. For example, when virtual memory is enabled, CR3 may enable the processor to translate virtual addresses into physical addresses by locating a page directory and page tables for a currently executing thread. In some implementations, the upper bits of CR3 may include a page directory base register (PDBR), which stores a physical address of a first page directory entry.

A TLB may a fixed number of entries that map virtual addresses to physical addresses. A virtual address is an address space associated with a particular thread. The address space is segmented into pages of a fixed size. A page table keeps track of which of the virtual pages are loaded into the physical memory. Thus, the TLB may be viewed as a cache of the page table because the TLB stores a subset of the contents of the page table. The TLB entries may include references to physical memory addresses. The TLB may reside between a core and a level one cache, between another cache level and a main memory, or between cache levels of a processor that includes a multi-level cache. Caches that use virtual addressing may use a virtual address and, optionally, an ASID to look up physical addresses.

In some implementations, the TLB may be implemented as a multiple entry two-way set-associative buffer. In some implementations, each TLB entry may include a virtual address, a page size, a physical address, and a set of memory properties. Each entry in the TLB may be marked as being associated with a particular application space (ASID). A TLB entry may match when these conditions are true: (i) a virtual address in the TLB entry matches that of the requested address, (ii) the ASID in the TLB entry matches the current ASID. The TLB is updated in such a way that only one TLB entry matches at any time. The TLB may store entries based on block sizes, including 4 kilobytes (KB), 64 KB, 1 megabyte (MB) and/or 16 MB block sizes.

In some implementations, a processor may have a TLB associated with each ACE (or other resource). For example, a processor with four ACE units may have four TLBs, with each TLB dedicated to serve a particular ACE. In other implementations, the TLB may be included in a memory management unit (MMU) which serves multiple ACE units. For example, the TLB may be included in an input/output memory management unit (IOMMU). An IOMMU is a memory management unit (MMU) that connects a DMA-capable I/O bus to main memory. Just as a traditional MMU translates CPU-visible virtual addresses to physical addresses, the IOMMU may map device-visible virtual addresses (also referred to as device addresses or I/O addresses) to physical addresses.

Thus, in a processor with a resource such as the ACE, multiple threads may each send transactions for execution by the ACE. Some of the multiple threads may operate in the same address space while other threads may operate in different address spaces. To enable the ACE to distinguish address spaces from threads executing on different cores, a core identifier may be associated with each entry (e.g., each virtual address to physical address translation) in the TLB. By associating a core identifier with each entry in the TLB, the ACE may identify translations (e.g., entries in the TLB) that are associated with a particular thread executing on a particular core. In addition, when a particular thread is invalidated, the TLB may flush (e.g., remove) entries in the TLB that are associated with the particular thread.

However, because some of the multiple threads may share the same address space, the TLB may include multiple entries for the same translation. For example, if three threads executing on a particular core all share the same address space, the TLB may include three entries with the same virtual address to physical address translation for the particular core. Duplicate entries in a TLB may waste space and may result in an increased number of TLB-misses because the TLB may have a fixed number of entries. Thus, associating a core identifier with each entry in the TLB may be inefficient.

Efficiently Handling Transactions from Multiple Cores

To enable a TLB to support an ACE that handles transactions from multiple threads executing on multiple cores, where at least some of the threads on a particular core share the same address space, ACE may include (1) a TLB in which an address space identifier (ASID) that identifies a virtual address associated with a particular thread is included in each entry in the TLB, (2) a core to ASID mapping that is indexed by a core identifier, and (3) an ASID to page-table register (e.g., CR3 or equivalent register) mapping that is indexed by the ASID. The core to ASID mapping implemented may be as a core-ASID table and the ASID to page-table register mapping may be implemented as an ASID-Page-Table Register mapping.

Steady State

A steady state may occur when the core-ASID table and the ASID-Page-Table Register mapping each contain at least one valid entry. The ACE may receive a transaction that includes an identifier of the logical core that sent the transaction and a virtual address where the parameters of the transaction may be found. The Core to ASID lookup may be performed before the ACE starts executing the transaction and may be performed by the core that is sending the transaction, by the ACE after receiving the transaction, or anywhere in-between. After the transaction (e.g., ACB address) is sent from a particular thread, an ASID associated with the particular thread may be retrieved from the core-ASID table. The core to ASID translation may be performed before the ACE receives the transaction. If physical memory is to be accessed during execution of the transaction, the ACE may search the TLB using a virtual address and the ASID associated with the particular thread. If a hit occurs (e.g., a match is found), the physical address may be retrieved from the TLB. If a miss occurs, a TLB-miss may be flagged and a page walk may be performed. For example, a page-table register (e.g., CR3) associated with the particular thread may be retrieved from the ASID-Page Table Register mapping. The ASID and the page-table register may be used to perform a page walk to identify the physical memory that is to be accessed. An entry that includes the physical memory identified by the page walk may be added to the TLB.

Context Switch-Out

When a thread and a context associated with the thread are switched-out by a core, active ACE transactions from that core may be flushed from an execution pipeline of the ACE rushed into the pipe or flushed (e.g., removed). When a transaction is rushed, the transaction may be marked as "faulty" and passed down the pipeline to prevent the transaction from blocking other transactions in the execution pipeline. When the transaction marked "faulty" reaches the end of the execution pipeline, the transaction may be moved to a special queue where the transactions waits until an exception (e.g. page fault) that caused the context switch is resolved. Once the exception that caused the context switch is resolved, the transaction may be placed back at the start of the execution pipeline. In some implementations, when a particular context is switched out, all entries in the TLB that are associated with the particular context may be invalidated.

To increase efficiency, the ACE may determine whether the ASID used by the core is also used by another core. If another core is using the ASID, then the ASID is still in use. If none of the other cores are using the ASID, then one or more of the TLB, the Core-ASID table, or the ASID-Page Table register mapping may be updated to remove entries that include the ASID because the ASID is no longer in use.

The ACE may use order buffers (e.g., ACE Order Buffers (AOBs)) to keep track of transaction that are in execution ("in-flight"). The order buffers may also enable programmer transparent handling of page faults and context switches. In some implementations, an order buffer may be associated with each core. The order buffers may be internal to ACE inaccessible/invisible to the threads. Each order buffer may include content that is part of the process state to preserve the content over a context switch. Each order buffer may be implemented as a cyclical array. The order buffer may include a pointer to the ACB associated with the transaction, a size of the ACB, a status of transaction (e.g., new transaction, inside execution pipeline, completed transaction, page fault occurred, invalid transaction, and the like), other contents related to the ACB, or any combination thereof. In some implementations, the AOB structure may include one or more index registers, such as a first register ("head") that indexes the first active transaction that is still in flight for a thread executing on a particular core, a second register ("tail") that indexes a next to last active transaction of the thread, and a third register ("next") that indexes the next transaction to be sent for execution.

Context Switch-In

When a thread and a context associated with the thread are switched-in by a core, the ACE or the core may determine if the ASID-page table register mapping has an entry that includes a page table register (e.g., CR3) associated with the thread. If the ASID-page table register mapping does not have an entry that includes the page table register associated with the thread, then a new ASID may be generated. An entry that includes the new ASID may be added to the ASID-page table mapping and to the core-ASID table. The order buffer associated with the thread may be retrieved.

Example Framework

FIG. 1 illustrates an example framework 100 that includes an acceleration compute engine (ACE) according to some implementations. The framework 100 includes a processor 102. The processor 102 may include a last-level cache (LLC) 104, a first core 106, and additional cores up to and including an $N^{th}$ core 108 (where N is greater than 1), and an ACE 110.

The processor 102 may include one or more storage structures, such as a core to address space identifier (ASID) table 112 and an ASID to page-table register mapping 114, The ACE 110 may include a translation lookaside buffer (TLB) 116. The core to ASID table 112 or the ASID to page-table register mapping may be created and maintained by software external to the processor 102, by hardware included in the processor 102, or a combination of both. The ACE 110 may access the TLB 116 using the ASID. When a TLB miss occurs, the ACE 110 may access the ASID to page-table register mapping 114 to retrieve the page-table register (e.g., CR3). In some implementations, the ACE 110 may update the core to address space identifier table 112 and the ASID to page table register mapping 114 in a manner that is transparent to an operating system that is executed by the processor 102. For example, the N cores 106 to 108 may provide a core identifier to the ACE 110 and the ACE 110 may manage (e.g., update or access) the core to address space identifier table 112 and the ASID to page table register mapping 114. In other implementations, an operating system or the N cores 106 to 108 may manage (e.g., update or access) the core to address space identifier table 112 and the ASID to page table register mapping. In such implementations, a particular core may provide the ASID and page-table register (e.g., CR3) to the ACE 110. Each of the N cores 106 to 108 may include one or more registers, one or more execution units, and one or more levels of cache memory. For example, the first core 106 may include a first set of registers 118, a first set of execution units 120, and a first level one (L1) cache 122. The $N^{th}$ core 108 may include an $N^{th}$ set of registers 124, an $N^{th}$ set of execution units 126, and an $N^{th}$ L1 cache 128. The N cores 140 to 142 may be logical cores or physical cores.

The ACE 110 may include registers, execution units, memory, and the like. For example, the ACE 110 may include ACE registers 130, ACE execution units 132, a local memory 134, a first order buffer 136, and additional order buffers up to and including an $N^{th}$ order buffer 138 (where N>1). The local memory 134 may include cache memory, random access memory, other types of computer-readable storage media, or any combination thereof. Each of the N order buffers 136 to 138 may correspond to the N cores 140 to 142. For example, the first order buffer 136 may correspond to the first core 106 and the $N^{th}$ order buffer 138 may correspond to the $N^{th}$ core 108. Each of the N order buffers 136 to 138 may be used to keep track of in-flight transactions (e.g., transactions sent for execution to an execution unit) to enable transparent handling of page faults and context switches.

The content in each of the N order buffers 136 to 138 may include part of a process state and may be preserved across context switches. The N order buffers 136 to 138 may each be implemented as an array, such as a cyclical buffer that is an internal structure of the ACE 110. For example, the order buffer 136 may include a pointer to an ace control block (ACB) that includes information for a particular transaction.

Each of the N order buffers 136 to 138 may include information, such as a size of an ACB and a status field identifying a status of the transaction, such as, whether the transaction is a new transaction, whether the transaction is inside an execution pipe, whether the transaction is done, whether a page fault has occurred, or whether the transaction has been invalidated. Each of the N order buffers 136 to 138 may include one or more index registers, such as a first register ("head") that indexes the first active transaction that is still in flight for a thread executing on a particular core, a second register ("tail") that indexes a next to last active transaction of the thread, and a third register ("next") that indexes the next transaction to be sent for execution.

The core to ASID table 112 may include one or more fields, such as a core identifier field, an ASID field, and a flag indicating whether the ASID is active. The core to ASID table 112 may be searched using a particular core identifier. The ASID to page-table register mapping 114 may include one or more fields, such as an ASID field and a page table register field. The ASID to page-table register mapping 114 may be searched using a particular ASID. The page table register may be a register (e.g., CR3) that enables a core to translate a virtual address to a physical address by locating a page directory and page tables for a particular transaction. The TLB 116 may include multiple fields, such as an ASID field, a flag indicating whether the address space is valid, a virtual address ("tag"), and a physical address. The TLB 116 may be searched using a particular virtual address and a particular ASID. In FIG. 1, the core to ASID table 112, the ASID to page-table mapping 114, and the TLB 116 are shown as each including two entries for illustration purposes. In a particular implementation, the core to ASID table 112, the ASID to page-table mapping 114, and the TLB 116 may have more than two entries, such as 64 entries, 128 entries, 256 entries, 512 entries, and the like. In addition, the number of entries in each of the core to ASID table 112, the ASID to page-table mapping 114, and the TLB 116 may vary. For example, the core to ASID table 112 may have N number of entries (where N is the number of cores), the ASID to page-table mapping 114 may have Y number of entries, and the TLB 116 may have Z number of entries, where N, Y, and Z are integers greater than one and where N may be different from Y and Z and Y may be different from Z.

In operation, the first core 106 may execute a first thread 140 and the $N^{th}$ core 108 may execute an $N^{th}$ thread 142. One of the threads 140 or 142 may send an ACB 144 for execution by the acceleration compute engine 110. The ACB 144 may result in one or more instructions 146 for execution by the ACE 110. For example, the ACB 144 may include a header block that includes a status (e.g., new, inside execution pipe, done, page fault, invalid, and the like) associated with execution of the instructions 146. The ACB 144 may include an input parameter identifier that identifies input parameters to the ACE 110. The ACB 144 may include an output data identifier that identifies the results of processing the input parameters and/or the instructions 146. The ACB 144 may include an output error identifier that identifies output error-related data, such as error messages and data dumps (e.g., contents of registers, caches, pipelines, and the like). Of course, the ACB may include other content in addition to or instead of the previously described content. For example, the content of the ACB may vary depending on the particular function of the ACE that is being called.

In response to receiving the ACB 144 from one of the threads 140 or 142, the ACE 110 may retrieve a particular ASID and a particular page-table register (e.g., CR3 or equivalent) associated with the thread that sent the ACB 144. The ACE 110 may retrieve the particular ASID associated with the transaction (e.g., the ACB 144) by searching the core to ASID table 112 using a core identifier of the core that sent the ACB 144. For example, the ACE 110 may determine that the ACB 144 was sent by the $N^{th}$ thread 142 that is executing on the $N^{th}$ core 106. The ACE 110 may search the core to ASID table 112 using the core identifier (e.g., N) of the $N^{th}$ core 108 to identify a particular ASID associated with the Nth thread 142 that is executing on the $N^{th}$ core 108.

After the ACE 110 retrieves the particular ASID from the core to ASID table 112, the ACE 110 may search the ASID to page-table register mapping 114 using the particular ASID to retrieve a particular page-table register (e.g., CR3 or equivalent) associated with the $N^{th}$ thread 142 that is executing on the $N^{th}$ core 108. The ACE 110 may retrieve a virtual address from the ACB 144. The ACE 110 may access the TLB 116 using the particular ASID and the virtual address to retrieve the physical address associated with the $N^{th}$ thread 142 that is executing on the $N^{th}$ core 108. The ACE 110 may determine whether the TLB 116 includes an entry that includes the particular ASID and a virtual address ("tag"). For example, the virtual address may be identified using the particular page-table register from the ASID to page table register mapping 114. The core identifier and ASID may be identified when the ACE 110 initiates processing a particular transaction and then remain associated with the particular transaction until the particular transaction has been completed. The TLB 116 may be accessed multiple times during processing of the particular transaction.

If the TLB 116 has an entry that includes the particular ASID and virtual address, the ACE 110 may retrieve the physical address from the entry of the TLB 116. The ACE 110 may use the physical address when executing the transaction (e.g., the ACB 144). For example, the ACE 110 may send the ACB 144 for execution to one of the ACE execution units 132.

If the ACE 110 determines that the TLB 116 does not include the ASID associated with the transaction (e.g., the ACB 144), then the ACE 110 may flag a TLB-miss. The ACE 110 may handle the TLB-miss by performing a page walk (or similar procedure) to identify a physical address that corresponds to the ASID. After identifying the physical address that corresponds to the ASID, the ACE 110 may update the TLB 116 to include the physical address associated with the ASID. The ACE 110 may access a memory (e.g., a physical memory of a device that includes the processor 102) using the physical address in the updated TLB 116.

Thus, when the TLB-miss is flagged, the ACE 110 may use structures in the processor 102, such as the core to ASID table 112, the ASID to page-table register mapping 114, another structure in the processor 102, or any combination thereof to identify the physical address corresponding to the ASID of the thread that sent the ACB 144.

Figure 2:
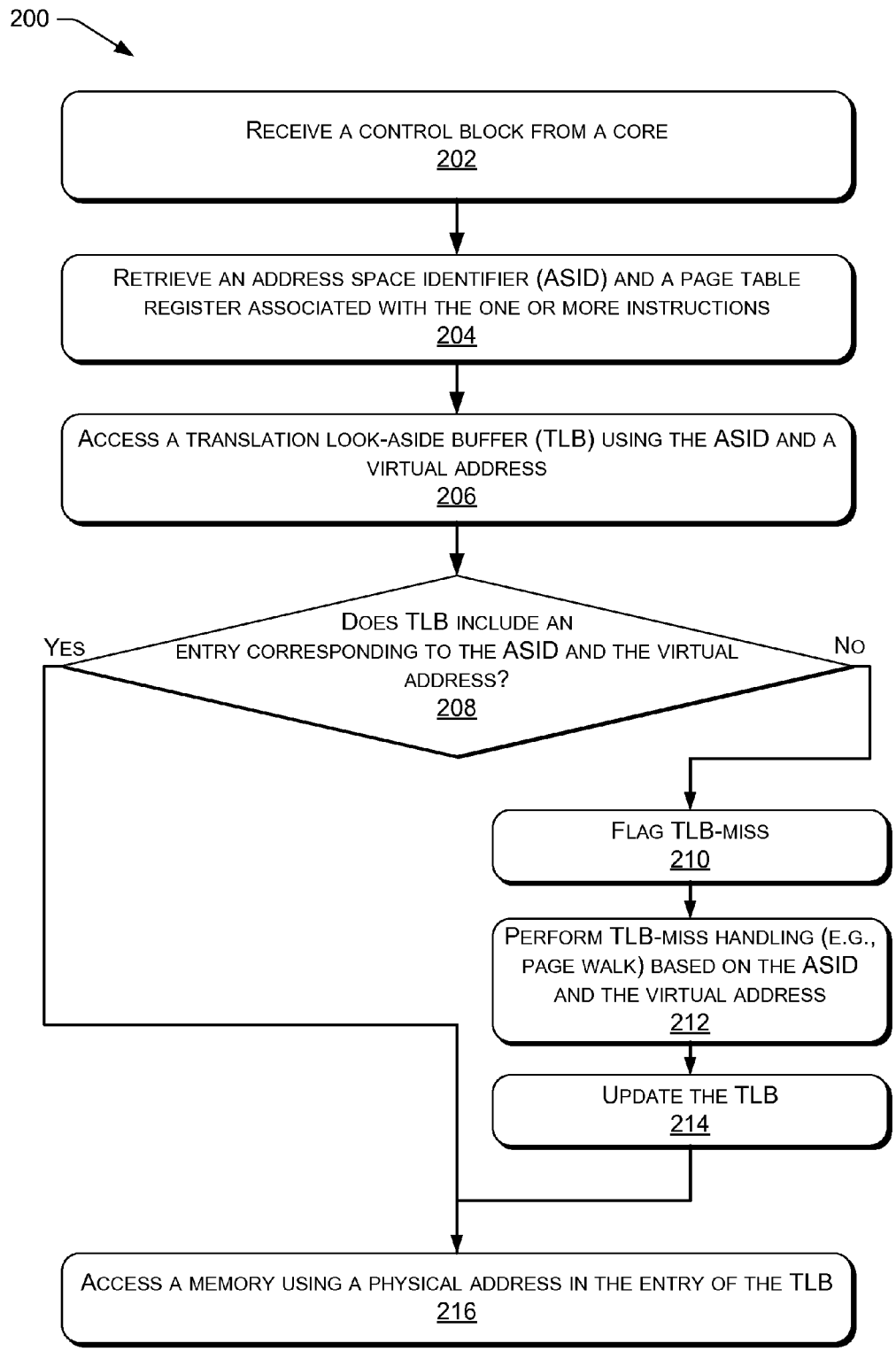
FIG. 2 illustrates a flow diagram of an example process that includes accessing a translation look-aside buffer using an address space identifier according to some implementations.

FIG. 2 illustrates a flow diagram of an example process 200 that includes accessing a TLB using an ASID according to some implementations. For example, the process 200 may be performed by the ACE 110 of FIG. 1.

At 202, a transaction that passes a control block is received from a core. For example, in FIG. 1, the transaction passing ACB 144 may be received from the first core 106 or the $N^{th}$ core 108.

At 204, an ASID and a page-table register associated with the transaction are retrieved. For example, in FIG. 1, the ACE 110 may retrieve the ASID from the core to ASID table 112 and retrieve the page-table register (e.g., CR3) from the ASID to page table register mapping 114.

At 206, a TLB may be accessed using the ASID and a virtual address. For example, in FIG. 1, the ACE 110 may access the TLB 116 using the particular ASID retrieved from the core to ASID table 112 and a virtual address that is retrieved from the ACB 144.

At 208, a determination is made whether the TLB includes an entry corresponding to the ASID and the virtual address. For example, in FIG. 1, the ACE 110 may determine whether the TLB 116 includes an entry corresponding to the ASID and the virtual address.

In response to determining that the TLB does not include an entry that includes the ASID and the virtual address, at 208, a TLB-miss is flagged, at 210.

At 212, a TLB-miss handling procedure is performed based on the ASID and the virtual address. For example, a page walk process may be performed by the ACE 112 using the core to ASID table 112 and the ASID to page table register mapping 114 to determine a physical address.

At 214, the TLB 116 may be updated after performing the TLB-miss handling procedure. For example, after performing a page walk (or equivalent), the TLB 116 may be updated to include an entry that includes the ASID, the virtual address, and the physical address and valid flag in the entry may be set to indicate that the entry is valid.

At 216, the memory may be accessed using a physical address in the entry of the TLB 116. For example, in FIG. 1, a cache entry or memory that is accessible by the processor 102 may be accessed.

In response to determining that the TLB includes an entry that includes the ASID and the virtual address, at 208, the process 200 proceeds to 216, where the memory is accessed using the physical address in the entry of the TLB.

Figure 3:
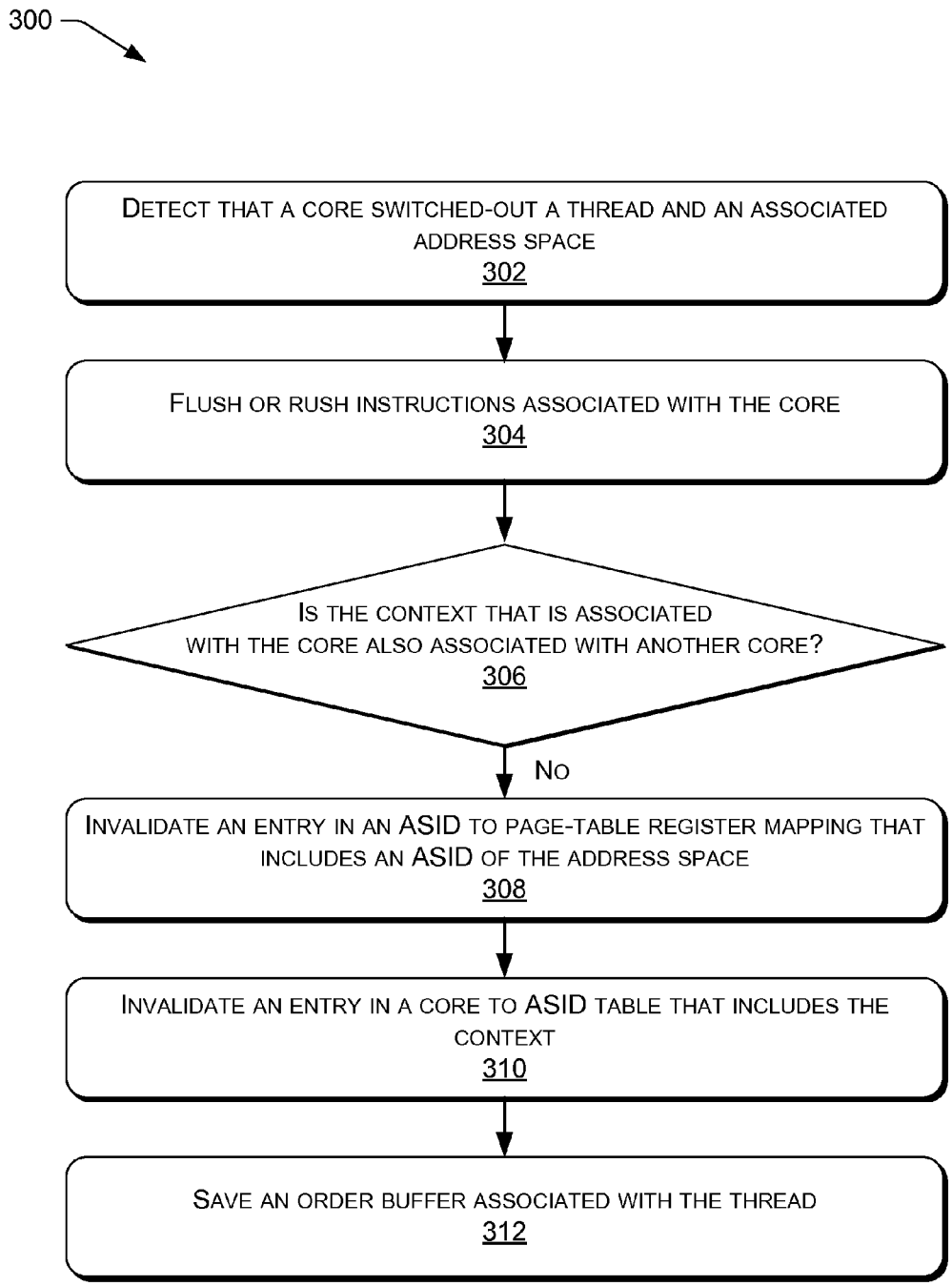
FIG. 3 illustrates a flow diagram of an example process that includes detecting that a core switched-out a thread and an associated context according to some implementations.

FIG. 3 illustrates a flow diagram of an example process 300 that includes detecting that a core switched-out a thread and an associated context, according to some implementations. For example, the process 300 may be performed by the ACE 110 of FIG. 1.

At 302, the ACE may detect that a core switched-out a thread and an associated address space. For example, in FIG. 1, the ACE 110 may determine that the $N^{th}$ core 108 switched-out the $N^{th}$ thread 142. The $N^{th}$ thread 142 may have associated address space that is identified by a particular ASID.

At 304, the transactions associated with the core may be rushed or flushed (e.g., removed) from an execution pipeline of the ACE. When a transaction is rushed, the transaction may be marked as "faulty" and passed down the pipeline to prevent the transaction from blocking other transactions in the execution pipeline. When the transaction marked "faulty" reaches the end of the execution pipeline, the transaction may be moved to a special queue (e.g., ACE Order Buffer) where the transactions waits until an exception (e.g. page fault) that caused the context switch is resolved. Once the exception that caused the context switch is resolved, the transaction may be placed back at the start of the execution pipeline. In some implementations, when a particular context is switched out, entries in the TLB that are associated with the particular context may be invalidated.

At 306, a determination is made whether an ASID associated with the core is also associated with a second core. In response to determining that the ASID associated with the core is also associated with a second core, then the core to ASID table 112, the ASID to page-table mapping 114, and the TLB 116 may remain unmodified.

In response to determining that an ASID associated with the core is not associated with a second core, at 306, an entry that includes the ASID of the address space may be identified in a ASID to page-table register mapping and the entry may be invalidated. For example, in FIG. 1, a flag in the ASID to page-table register mapping 114 may be set to indicate that the entry is no longer valid (e.g., invalid). The invalid entry may be removed or overwritten with a valid entry at a later point in time. Such invalidation can be done by either the hardware of one of the cores, the hardware of the ACE, or context switch software.

At 310, an entry in a core to ASID table that includes the ASID is invalidated. For example, in FIG. 1, a flag in the core to ASID table 112 may be set to indicate that the entry is invalid. The invalid entry may be removed or overwritten with a valid entry at a later point in time.

At 312, an order buffer is saved. For example, in FIG. 1, the ACE 110 may save the first order buffer 136 that is associated with the first core 106 or the $N^{th}$ order buffer 138 that is associated with the $N^{th}$ core 108.

Figure 4:
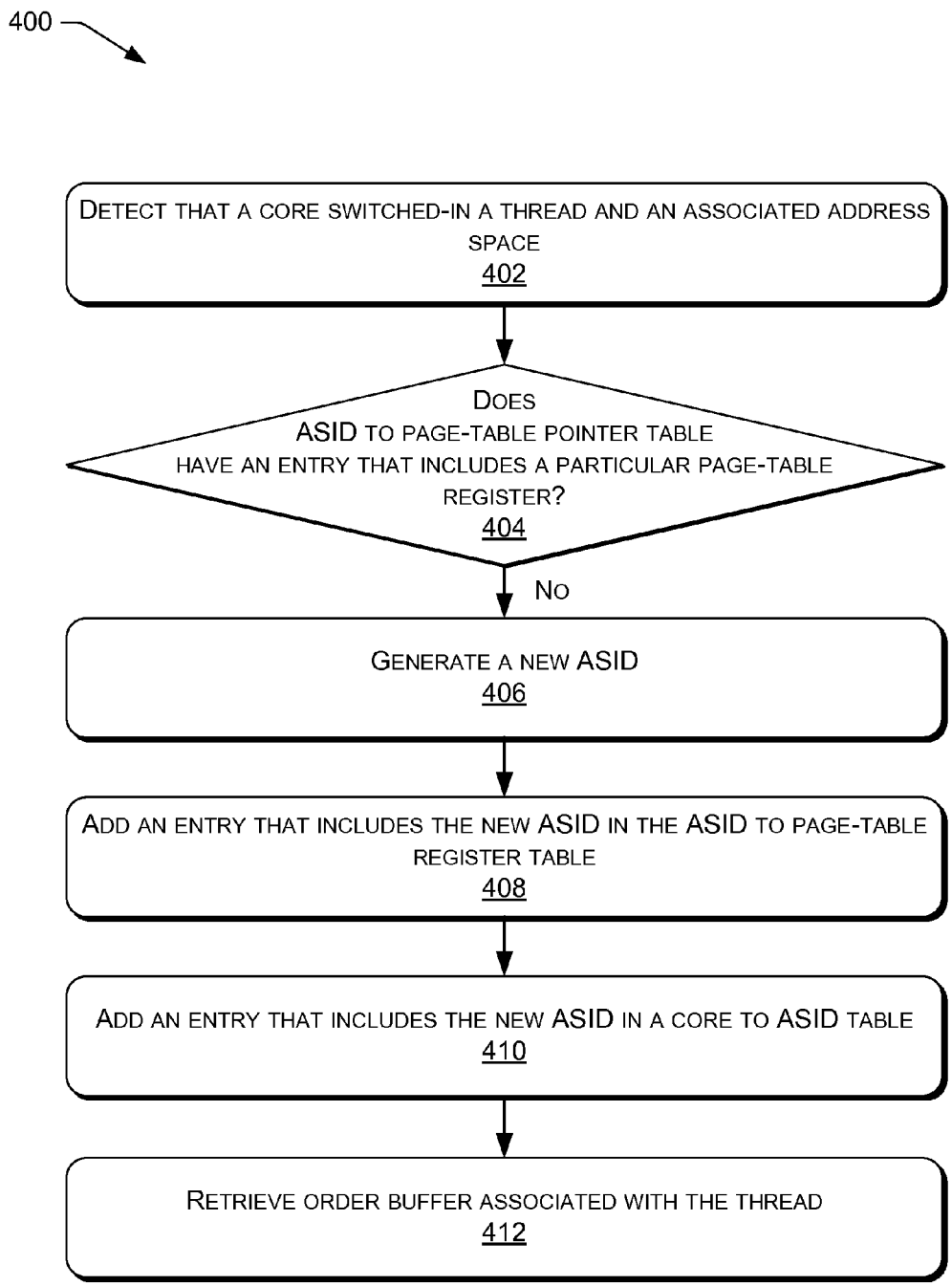
FIG. 4 illustrates a flow diagram of an example process that includes detecting that a core switched-in a thread and an associated context according to some implementations.

FIG. 4 illustrates a flow diagram of an example process 400 that includes detecting that a core switched-in a thread and an associated address space according to some implementations. For example, the process 400 may be performed by the ACE 110 of FIG. 1.

At 402, a determination may be made that a core switched-in a thread and then associated context. For example, in FIG. 1, the ACE 110 may determine that the $N^{th}$ core 108 switched-in a thread, such as the $N^{th}$ thread 142 and an associated address space.

At 404, a determination is made whether the ASID to page-table pointer table includes an entry that includes a particular page table register. For example, in FIG. 1, the ACE 110 may determine whether a page-table register (e.g., CR3 or equivalent) associated with the $N^{th}$ core 108 is included in the ASID to page table register mapping 114.

In response to determining that the ASID to page-table pointer mapping includes an entry with a particular page-table register, at 404, the core to ASID table, the ASID to page-table register mapping, and/or the TLB may remain unmodified.

In response to determining that the ASID to page-table pointer mapping does not include an entry with the particular page table register, at 404, a new ASID is generated, at 406. The new ASID may be associated with the address space of the thread that was switched-in by the core.

At 408, an entry that includes the new ASID is added to the address space to page-table register table. For example, in FIG. 1, the ACE 110 may determine that the $N^{th}$ core 108 switched-in the $N^{th}$ thread 142 and determine that the ASID to page table register mapping 114 does not include a particular page table register associated with the $N^{th}$ core 108. In response, the ACE 110 may add an entry to the ASID to page-table register mapping 114 that includes the page-table register (e.g., CR3) associated with the first core 106.

At 410, an entry that includes the new ASID may be added to the core to ASID table. For example, in FIG. 1, the ACE 110 may add an entry that includes the new ASID to the core to ASID table 112.

At 412, an order buffer associated with the thread may be retrieved. For example, in FIG. 1, the ACE 110 may retrieve the order buffer 138 associated with the $N^{th}$ thread 142.

Figure 5:
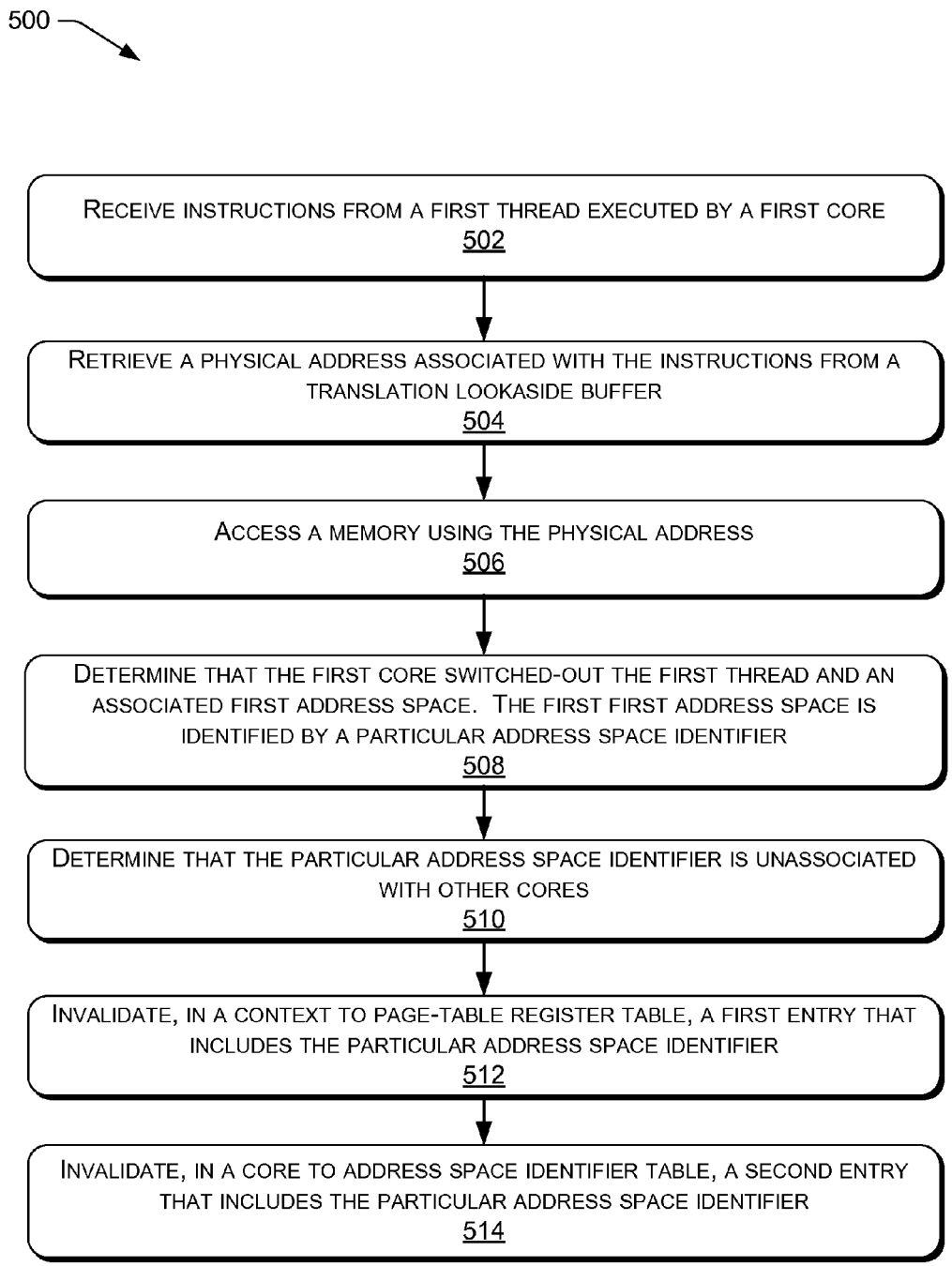
FIG. 5 illustrates a flow diagram of an example process that includes invalidating a first entry in a context to page-table register mapping that includes a particular address space identifier according to some implementations.

FIG. 5 illustrates a flow diagram of an example process 500 that includes invalidating a first entry in an ASID to page table register mapping that includes a particular ASID according to some implementations. For example, the process 500 may be performed by the ACE 110, FIG. 1.

At 502, a transaction may be received from a first thread executed by a first processing core. For example, in FIG. 1, the ACE 110 may receive the ACB 144 from the first thread 142 or from the $N^{th}$ thread 142.

At 504, a physical address associated with the transaction may be retrieved from a TLB. For example, in FIG. 1, the ACE 110 may retrieve a physical address associated with the ACB 144 from the TLB 116.

At 506, a memory may be accessed using the physical address. For example, in FIG. 1, a device that includes the processor 102 may include a memory that is accessed using the physical address retrieved from the TLB 116.

At 508, a determination may be made that the first core switched-out the first thread and an associated first address space. The first address space may be identified by an ASID. For example, in FIG. 1, the ACE 110 may determine that the first core 106 switched-out the first thread 142 and an associated first address space. The first address space may be identified by an ASID.

At 510, a determination is made that the ASID is unassociated with a second core of the plurality of the core. For example, in FIG. 1, the ACE 110 may determine that the ASID is associated with the first core 106 but not with other cores of the processor 102, such as the $N^{th}$ core 108.

At 512, a first entry in an ASID to page-table register mapping that includes the ASID is invalidated. For example, in FIG. 1, in the ASID to page-table register mapping 114, the ACE 110 may invalidate an entry that includes the ASID associated with the first core 106.

At 514, a second entry in a core to ASID table that includes the ASID may be invalidated. For example, in FIG. 1, in the core to ASID table 112, the ACE 110 may invalidate an entry that includes the ASID associated with the first core 106.

Figure 6:
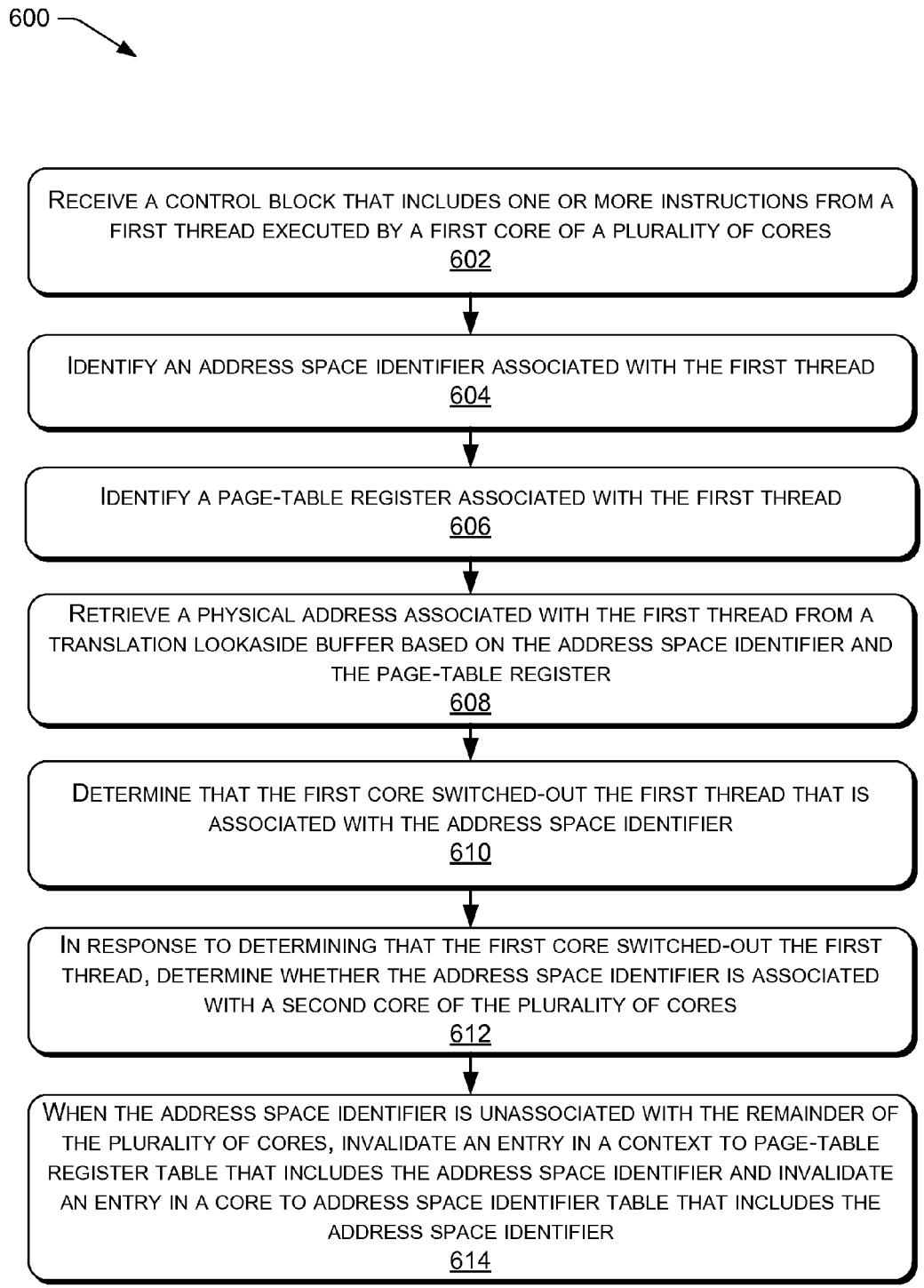
FIG. 6 illustrates a flow diagram of an example process that includes identifying a page-table register associated with a transaction according to some implementations.

FIG. 6 illustrates a flow diagram of an example process 600 that includes identifying a page-table register associated with a control block according to some implementations. For example, the process 600 may be performed by the ACE 110 of FIG. 1.

As 602, a control block including one or more instructions may be received from a first thread executed by a first processing core of a plurality of processing cores. For example, in FIG. 1, the ACE 110 may receive the ACB 144 from the first thread 142 that is being executed by the first core 106.

At 604, an ASID associated with the first core may be identified. For example, in FIG. 1, the ACE 110 may retrieve an ASID from the core to ASID table 112 using a core identifier of the first core 106.

At 606, a page-table register associated with the control block may be identified. For example, in FIG. 1, the ACE 110 may use the ASID to identify a page-table register (e.g., CR3 or equivalent) using the ASID to page-table register mapping 114.

At 608, a physical address associated with the transaction may be retrieved from a TLB, based on the ASID and the page-table register. For example, in FIG. 1, the ACE 110 may retrieve a physical address from the TLB 116 based on the ASID and the page-table register.

At 610, a determination may be made that the first core switched-out the first thread that is associated with the ASID. For example, the ASID may identify an address space of the first thread.

At 612, in response to determining that the first core switched-out the first context, a determination is made whether the ASID is associated with a second core of the plurality of cores.

At 614, when the ASID is unassociated with the second core of the plurality of cores, an entry that includes the ASID may be invalidated in a context to page-table register mapping and in a core to ASID table. For example, in FIG. 1, in response to determining that the first core 106 switched-out the first context, and that the first context is unassociated with any other cores of the processor 102, the ACE 110 may invalidate an entry that includes the ASID in the core to ASID table 112 and invalidate an entry that includes the ASID in the ASID to page table register mapping 114.

Figure 7:
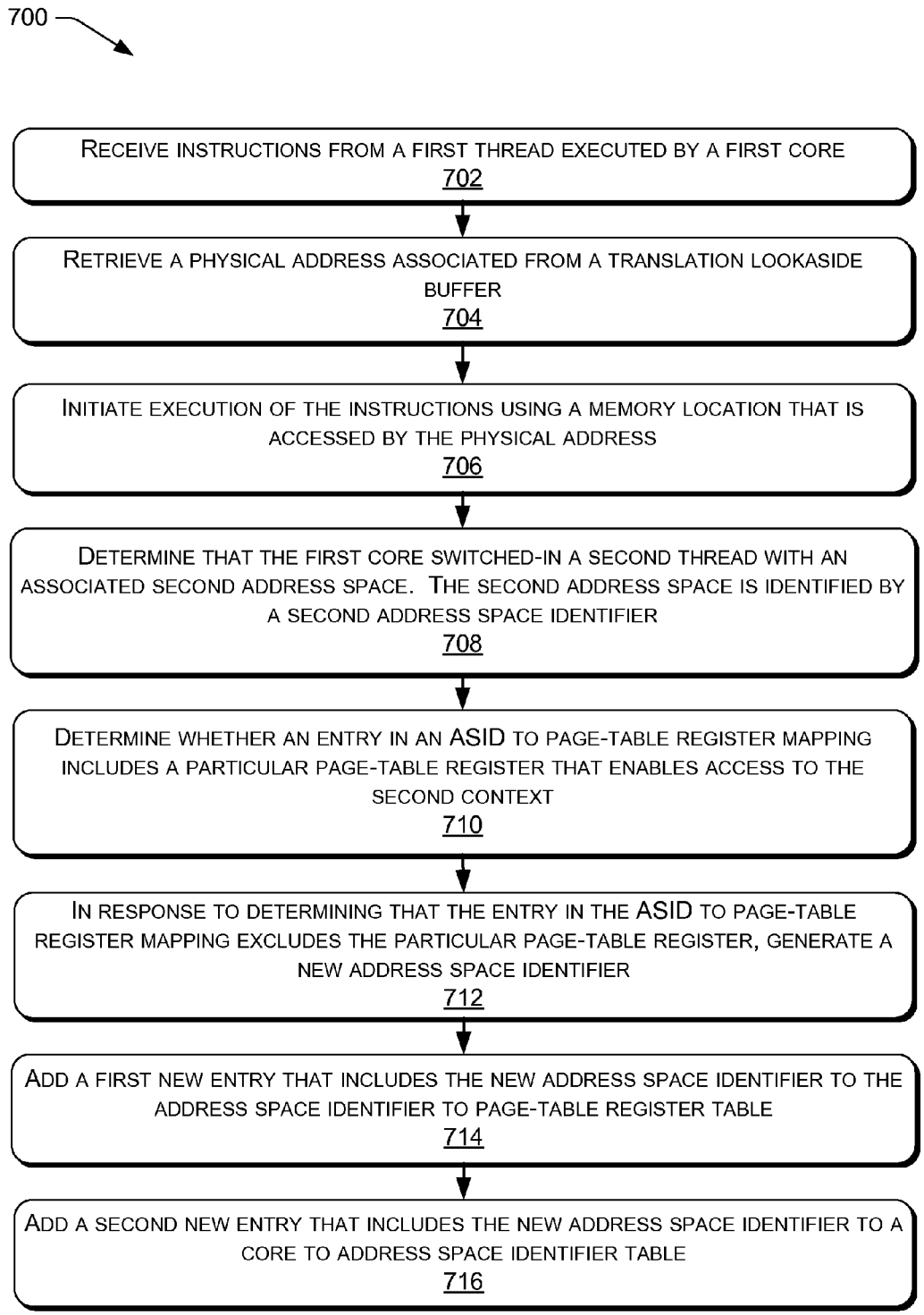
FIG. 7 illustrates a flow diagram of an example process that includes determining that a first core switched-in a second context associated with a second thread according to some implementations.

FIG. 7 illustrates a flow diagram of an example process that includes determining that the first core switched-in a second context associated with a second thread according to some implementations. For example, the process 700 may be performed by the ACE 110 of FIG. 1.

At 702, instructions are received from a first thread executed by a first core. For example, in FIG. 1, the ACE 110 may receive the ACB 144 including the instructions 146 from the first thread 142 that is being executed by the first core 106.

At 704, a physical address is retrieved from a TLB. For example, in FIG. 1, the ACE 110 may retrieve a physical address from the TLB 116 based on an ASID and a virtual address.

At 706, execution of the instructions is initiated using a memory location that is accessed by the physical address. For example, in FIG. 1, a physical memory of a device that includes the processor 102 may be accessed using the physical address when one of the ACE execution units 132 executes the instructions 146.

At 708, a determination is made that the first core switched-in a second thread with an associated second address space. The second address space is identified by a second ASID. For example, in FIG. 1, the first core 106 may switch-out the first thread 140 and switch-in a second thread.

At 710, a determination is made whether an entry in an ASID to page-table register mapping includes a particular page-table register associated with the second address space.

For example, in FIG. 1, the ACE 110 may determine whether an entry in the ASID to page-table register mapping 114 includes a particular page-table register associated with the second address space. In some cases, the core to ASID table may be updated while the ASID to page table register mapping may not be updated.

At 712, in response to determining that the entries in the ASID to page-table register mapping exclude the particular page-table register, a new ASID is generated. For example, in FIG. 1, in response to determining that the entries in the ASID to page-table register mapping 114 exclude the particular page-table register, the ACE 110 may generate a new ASID to associate with the second address space.

At 714, a first entry that includes the new ASID is added to the ASID to page table register table. At 716, a second new entry that includes the new ASID is added to a core ASID table. For example, in FIG. 1, the ACE 110 may update the core to ASID table 112 and the ASID to page-table register mapping 114 to each include an entry that includes the new ASID that is associated with the second address space of the second thread.

Figure 8:
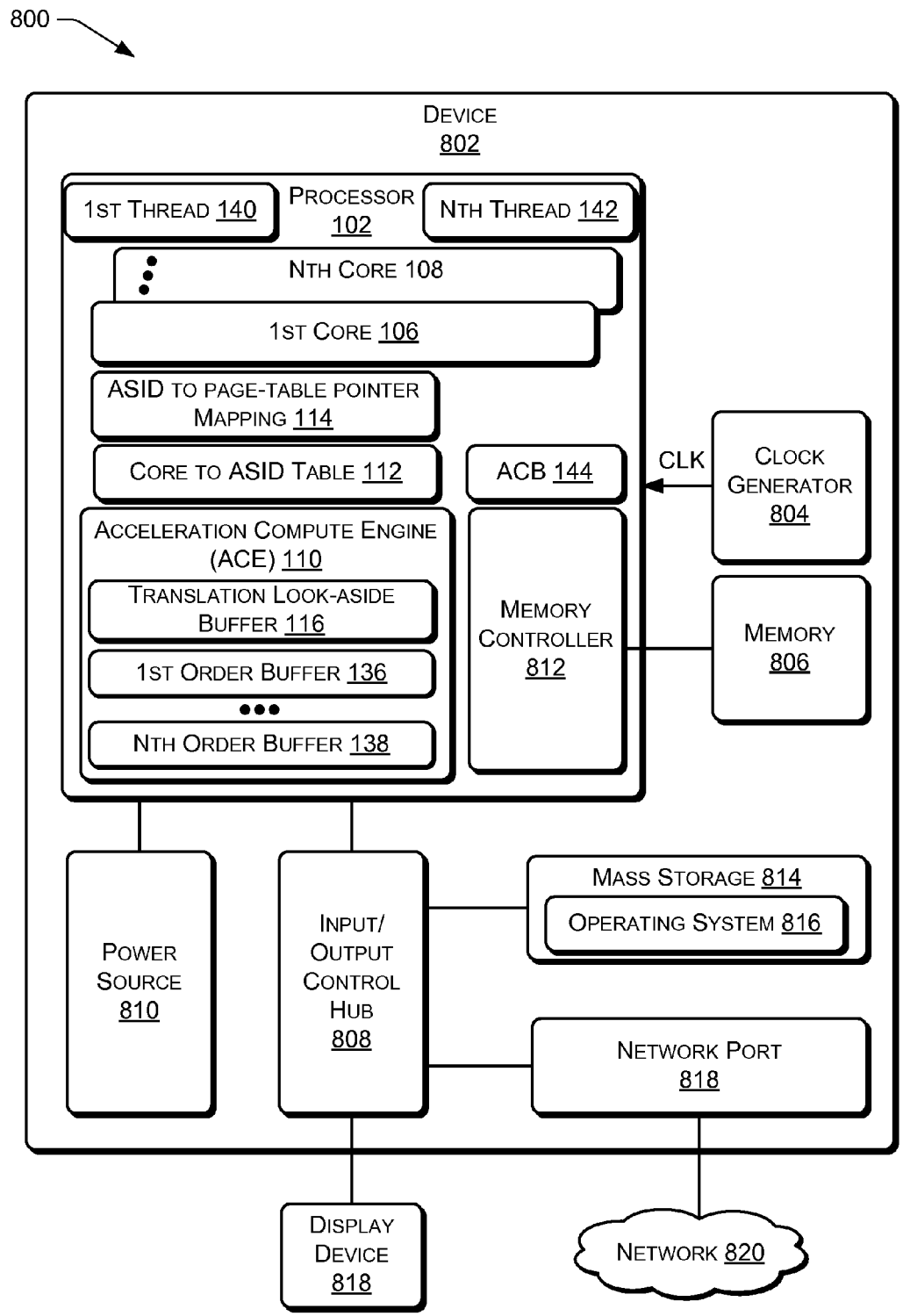
FIG. 8 illustrates an example system architecture including a device that includes a translation lookaside buffer to support multiple contexts according to some implementations.

FIG. 8 illustrates an example framework 800 of a device that includes a translation lookaside buffer to support multiple contexts according to some implementations. The framework 800 includes a computing device 802, such as a desktop computing device, a laptop computing device, tablet computing device, netbook computing device, wireless computing device, and the like.

The device 802 may include one or more processors, such as a processor 102, a clock generator 804, a memory 806 (e.g., random access memory), an input/output control hub 808, and a power source 810 (e.g., a battery or a power supply). The processor 102 may include multiple cores, such as the first core 106 and one or more additional cores, up to and including an $N^{th}$ core 108, where N is greater than 1. The processor 102 may include a memory controller 812 to enable access (e.g., reading from or writing) to the memory 806.

In addition, the processor 102 may include the ACE 110, the core to ASID table 112, and the ASID to page-table pointer mapping 114. The ACE 110 may include the TLB 116 and N order buffers, such as the $1^{st}$ order buffer 136 and the $N^{th}$ order buffer 138. Multiple threads may execute on the N cores 106 to 108. For example, the first core 106 may execute the first thread 140 and the $N^{th}$ core 108 may execute the $N^{th}$ thread 142. The ACE 110 may perform specialized functions, such as graphics-related functions, for the N threads 140 to 142. The threads 140 or 142 may send control blocks, such as the ACB 144, to instruct the ACE 110 to perform various functions. To enable fine-grained control over the operation of the ACE, the threads may enable the ACE 110 to directly access (e.g., read from and write to) the address space associated with each thread. To efficiently manage virtual address to physical address translations, the ACE 110 may maintain structures, such as the core to ASID table 112, the ASID to page-table pointer mapping 114, and the TLB 116. The structures 112, 114, and 116 may enable the ACE 110 to manage multiple address spaces associated with multiple threads executing on multiple cores while maintaining a single entry in the TLB for each unique virtual address to physical address mapping. In a system that includes multiple ACE units, each ACE unit may have a corresponding (e.g., dedicated) TLB. In some implementations, the ASID to page-table pointer mapping 114 and/or the core to ASID table 112 may be used by two or more ACE units and, in some cases, by all the ACE units in the system. In other implementations, each of the multiple ACE units may have a corresponding (e.g., dedicated) ASID to page-table pointer mapping and/or core to ASID table 112.

The clock generator 804 may generate a clock signal that is the basis for an operating frequency of one or more of the N cores 218 and 812 of the processor 804. For example, one or more of the N cores 218 and 812 may operate at a multiple of the clock signal generated by the clock generator 806.

The input/output control hub 808 may be coupled to a mass storage 814. The mass storage 814 may include one or more non-volatile storage devices, such as disk drives, solid state drives, and the like. An operating system 816 may be stored in the mass storage 814.

The input/output control hub 808 may be coupled to a network port 818. The network port 818 may enable the device 802 to communicate with other devices via a network 820. The network 820 may include multiple networks, such as wireline networks (e.g., public switched telephone network and the like), wireless networks (e.g., 802.11, code division multiple access (CDMA), global system for mobile (GSM), Long term Evolution (LTE) and the like), other types of communication networks, or any combination thereof. The input/output control hub may be coupled to a display device 818 that is capable of display text, graphics, and the like.

As described herein, the processor 102 may include multiple computing units or multiple cores. The processor 102 can be implemented as one or more microprocessors, microcomputers, microcontrollers, digital signal processors, central processing units, state machines, logic circuitries, and/or any devices that manipulate signals based on operational instructions. Among other capabilities, the processor 102 can be configured to fetch and execute computer-readable instructions stored in the memory 806, the mass storage 814, or other computer-readable media.

The memory 806 is an example of computer storage media for storing instructions which are executed by the processor 102 to perform the various functions described above. The memory 806 may generally include both volatile memory and non-volatile memory (e.g., RAM, ROM, or the like). The memory 806 may be referred to as memory or computer storage media herein, and may be a non-transitory media capable of storing computer-readable, processor-executable program instructions as computer program code that can be executed by the processor 102 as a particular machine configured for carrying out the operations and functions described in the implementations herein. The processor 102 may include components for enabling a resource, such as the ACE 110, to be efficiently accessed by multiple threads executing on multiple cores according to the implementations herein.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

What is claimed is:

1. A processor comprising:
   a plurality of processing cores; and
   a logic engine that is shared by the plurality of processing core, the logic engine including:
      a translation lookaside buffer to enable the logic engine to directly access a virtual address of a thread executing on one of the plurality of processing cores, and
      logic to
         receive a control block from a first thread executed by a first processing core of the plurality of processing cores, the control block including one or more instructions for execution by the logic engine,
         retrieve a physical address associated with the control block from the translation lookaside buffer by
            identifying an address space identifier associated with the control block,
            identifying a page-table register associated with the control block, and
            retrieving the physical address associated with the control block from the translation lookaside buffer based on the address space identifier and the page-table register; and
         access a memory using the physical address.

2. The processor as recited in claim 1, the logic to:
   determine whether the first processing core switched-out the first thread and an associated first context, the associated first context identified by the address space identifier; and
   in response to determining that the first processing core switched-out the first thread and the associated first context, determine whether the address space identifier is associated with a second processing core of the plurality of cores.

3. The processor as recited in claim 2, in response to determining that the address space identifier is unassociated with the second processing core, the logic to:
   invalidate a first entry in a context to page-table register table that includes the address space identifier; and
   invalidate a second entry in a processing core to address space identifier table that includes the address space identifier.

4. The processor as recited in claim 3, the logic to save an order buffer associated with the logic engine.

5. The processor as recited in claim 1, the logic to:
   determine that the first processing core switched-in a second thread and an associated second context, the associated second context identified by a second address space identifier; and
   determine whether a third entry in an address space identifier to page-table register table includes a particular page-table register that enables access to the associated second context.

6. The processor as recited in claim 5, in response to determining that the third entry in the address space identifier to page-table register table excludes the particular page-table register, the logic to:
   generate a new address space identifier;
   add a first new entry that includes the new address space identifier to the address space identifier to page-table register table; and
   add a second new entry that includes the new address space identifier to a core to address space identifier table.

7. The processor as recited in claim 6, the logic to retrieve an order buffer associated with the logic engine.

8. A system comprising:
   a processor that includes a plurality of processing cores;
   a logic engine that includes:
      a translation lookaside buffer to enable the logic engine to directly access a virtual address associated with a thread executing on a particular processing core of the plurality of processing cores, wherein the logic to
         receive one or more instructions from a first thread executed by a first processing core of the plurality of processing cores, the one or more instructions to be executed by the logic engine,
         retrieve a physical address associated with the one or more instructions from the translation lookaside buffer, the physical address to be accessed when executing the one or more instructions,
         identify an address space identifier associated with the first thread,
         identify a page-table register associated with the first thread, and
         retrieve the physical address associated with the first thread from the translation lookaside buffer based on the address space identifier and the page-table register.

9. The system as recited in claim 8, the logic to:
   determine that the first processing first core switched-out a first context associated with the first thread, the first context identified by the address space identifier; and
   in response to determining that the first processing core switched-out the first context, determine whether the address space identifier is associated with a second processing core.

10. The system as recited in claim 9, in response to determining that the address space identifier is unassociated with the second processing core, the logic to:
  invalidate a first entry in a context to page-table register table that includes the address space identifier; and
  invalidate a second entry in a processing core to address space identifier table that includes the address space identifier.

11. The system as recited in claim 8, the logic to:
  determine that the first processing core switched-in a second context associated with a second thread, the second context identified by a second address space identifier; and
  determine whether a third entry in a address space identifier to page-table register table includes a particular page-table register that enables access to the second context.

12. The system as recited in claim 11, in response to determining that the third entry in the address space identifier to page-table register table excludes the particular page-table register, the logic to:
  generate a new address space identifier;
  add a first new entry that includes the new address space identifier to the address space identifier to page-table register table;
  add a second new entry that includes the new address space identifier to a processing core to address space identifier table; and
  retrieve an order buffer.

13. A method comprising:
  receiving, at a logic engine shared by a plurality of threads, a control block including one or more instructions from a first thread of the plurality of threads;
  identifying an address space identifier associated with the control block;
  identifying a page-table register associated with the control block; and
  retrieving a physical address associated with the control block from a translation lookaside buffer based on the address space identifier and the page-table register; and
  performing the one or more instructions using a memory location that is accessed by the physical address.

14. The method as recited in claim 13, further comprising:
  determining that a first core switched-out a first context associated with the first thread, the first context identified by the address space identifier;
  determining whether the address space identifier is associated with a second core;
  in response to determining that the address space identifier is unassociated with the second core, invalidating a first entry in a context to page-table register table that includes the address space identifier;
  invalidating a second entry in a core to address space identifier table that includes the address space identifier; and
  saving an order buffer associated with the logic engine.

15. The method as recited in claim 14, further comprising flushing other transactions associated with the first core from a pipeline.

16. The method as recited in claim 14, further comprising:
  determining that the first core switched-in a second context associated with a second thread, the second context identified by a second address space identifier;
  determining whether a third entry in an address space identifier to page-table register table includes a particular page-table register that enables access to the second context;
  in response to determining that the third entry in the address space identifier to page-table register table excludes the particular page-table register, generating a new address space identifier;
  adding a first new entry that includes the new address space identifier to the address space identifier to page-table register table;
  adding a second new entry that includes the new address space identifier to the core to address space identifier table; and
  retrieving an order buffer associated with the logic engine.

\* \* \* \* \*